United States Patent [19]

McCombie

[11] 4,030,595
[45] June 21, 1977

[54] LATERALLY FLEXIBLE CONVEYOR CONSTRUCTION

[75] Inventor: Alan Keith McCombie, London, England

[73] Assignee: Molins Machine Company, Limited, England

[22] Filed: July 21, 1975

[21] Appl. No.: 597,434

Related U.S. Application Data

[60] Division of Ser. No. 234,833, March 15, 1972, abandoned, which is a continuation of Ser. No. 875,402, Nov. 10, 1969, abandoned.

[30] Foreign Application Priority Data

| Nov. 14, 1968 | United Kingdom | 54034/68 |
| Jan. 24, 1969 | United Kingdom | 4195/69 |
| Jan. 24, 1969 | United Kingdom | 4196/69 |
| Feb. 14, 1969 | United Kingdom | 8313/69 |
| Feb. 28, 1969 | United Kingdom | 10941/69 |

[52] U.S. Cl. .............................. 198/778; 198/844; 198/851; 198/347
[51] Int. Cl.² ........................................ B65G 17/06
[58] Field of Search .......... 198/136, 181, 189, 193, 198/194, 195, 20 C, 84, 778, 844, 850, 851, 347

[56] References Cited

UNITED STATES PATENTS

| 2,646,161 | 7/1953 | Lorig | 198/193 |
| 2,870,902 | 1/1959 | Rada et al. | 198/195 |
| 3,094,206 | 6/1963 | Stewart et al. | 198/181 |
| 3,450,250 | 6/1969 | Frisk | 198/189 |

*Primary Examiner*—John J. Love
*Assistant Examiner*—Jeffrey V. Nase
*Attorney, Agent, or Firm*—Craig & Antonelli

[57] ABSTRACT

For use in a conveyor system having a curved or nonlinear portion, a conveyor is provided which is sufficiently flexible to pass around a pulley and is also laterally flexible so as to move along a curved or helical path. The conveyor is formed of a plastic surface member which has a flexible zig-zag shape and is driven by a chain secured thereto at regular intervals. The chain is preferably formed of pairs of parallel links pivoted together about lateral axes parallel to the conveyor surface and being constructed to have lateral play whereby the chain can curve laterally in the direction of the article-supporting surface.

21 Claims, 8 Drawing Figures

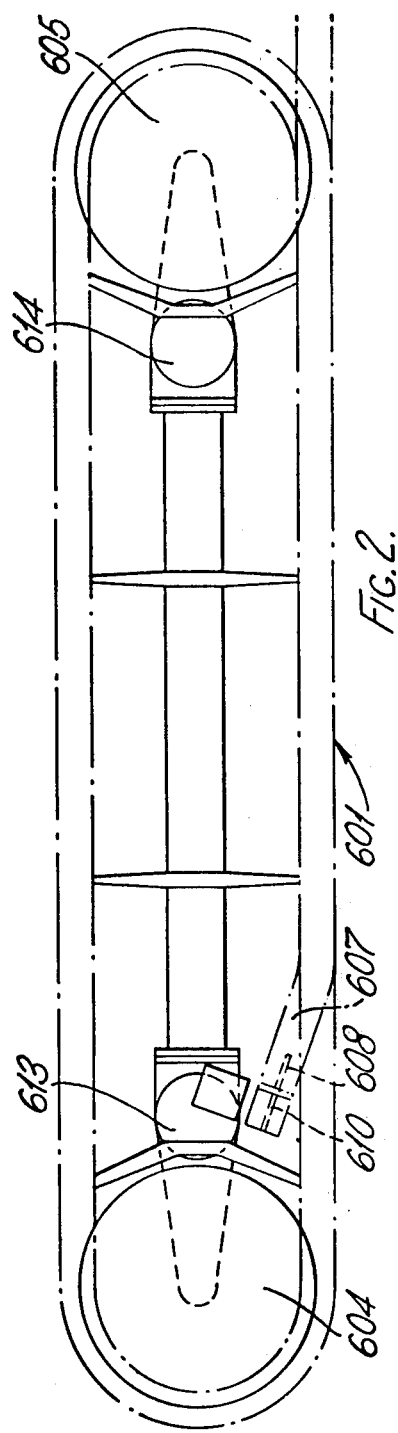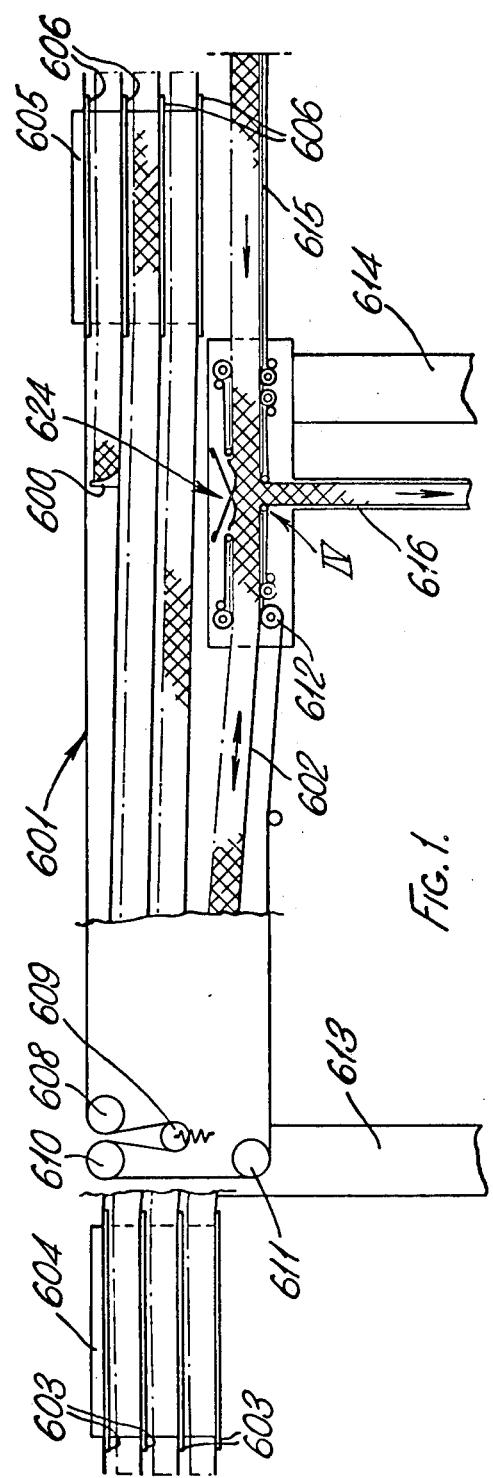

LATERALLY FLEXIBLE CONVEYOR CONSTRUCTION

This is a division of application Ser. No. 234,833, filed Mar. 15, 1972, now abandoned, which is a continuation of Ser. No. 875,402, filed Nov. 10, 1969, now abandoned.

This invention is particularly concerned with the feeding of cigarettes, but it is also applicable to the feeding of other rod-like articles, for example cigarette filter rods or cigars.

Various proposals have been made for feeding for example cigarettes from one or more cigarette-making machines to one or more cigarette-packing machines with the aid of a variable-capacity reservoir which absorbs or makes up the difference between the rates of supply and demand.

The reservoir may extend along a path which includes lateral bends, in which case the conveyor forming the floor of the reservoir must be made to be laterally flexible. The path may, for example, include a curved portion such as a helix. A suitable conveyor for this purpose in accordance with the present invention comprises a conveyor surface member which is flexible so as to be capable of passing round a pulley and is slotted at regular intervals from both edges so as to be capable of curving laterally; such a conveyor is preferably driven by a chain or other elongated tension member extending along the conveyor to withstand the tensile force applied to the conveyor during operation and to relieve the conveyor of any significant tensile force.

The conveyor is preferably formed of joined conveyor sections, each section comprising a row of parallel flexible legs integrally joined alternately at opposite ends to form a zig-zag configuration, at least one leg having a downwardly extending stud portion for engaging a tension member during use which serves to drive the conveyor. The end portion of the leg at the respective ends of the section being of reduced thickness or stepped so that a plurality of conveyor sections can be joined together to form the conveyor, each end portion being joined to an end portion on the next adjacent conveyor.

In a preferred embodiment, the end portion of one of the legs of reduced thickness is formed with a plurality of holes and the other of the legs of reduced thickness has a plurality of projections for engaging in the holes of an adjacent end portion of a similar section. In addition, a plurality of projecting portions extending downwards from at least some of the legs form two laterally spaced longitudinal rows for guiding the conveyor along a track during use.

Further features of the present invention include the provision of a pair of bottom protrusions on each leg forming two laterally spaced rows extending longitudinally along the component forming bearing surfaces for resting on the guide tracks during use. In addition, each leg may be provided with at least one offset portion providing a recess in the upper surface thereof thereby providing a longitudinal channel capable of accomodating the end of a bridge member.

Examples of various arrangements according to this invention are shown in the accompanying drawings. In these drawings:

FIG. 1 is a side view of part of one conveyor system including the reservoir;

FIG. 2 is a plan view of the reservoir;

Figure 3:
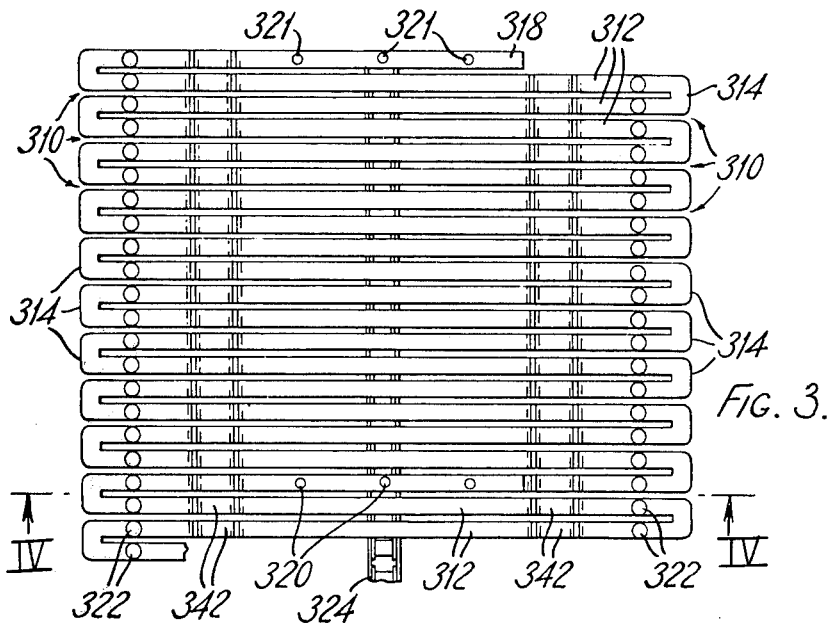
FIG. 3 is a plan view of part of a laterally flexible conveyor which forms the floor of the reservoir in FIG. 1.
Figure 4:
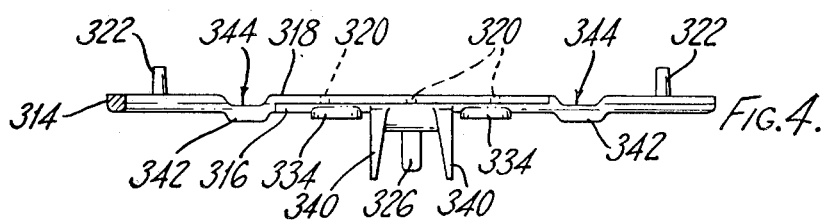
FIG. 4 is a section on the line IV—IV in FIG. 3.

The invention will be described with reference to its use in connection with cigarettes, but is should be understood that it can also be used in connection with other articles.

FIG. 1 shows part of a conveyor system which includes a helical reservoir 601 comprising a laterally flexible conveyor 602 which moves up a slightly inclined track leading to one of four flanges 603 on a rotatable drum 604 and then passes round the drum (being supported by the flange 603). The conveyor in accordance with this invention, which comprises a plastic surface member connected to a chain (as shown in FIGS. 3 to 8), is then carried by a track (not shown) towards a second drum 605 which has four support flanges 606. The conveyor then passes to and fro around the drum along a helical path, being supported by the flanges while passing round the drums. At the top of the helix, the conveyor is deflected inwards at 607 and then passes over and round a sprocket 608 engaging the chain, down and below a tensioning pulley 609, and then upwards and over a sprocket 610. Finally the conveyor returns round further sprockets 611 and 612.

The reservoir is mounted overhead on pillars 613 and 614 and is connected to a horizontal overhead conveyor 615 at a junction IV. A chute 616 extends downwards from the junction and supplies cigarettes to a cigarette packing machine (not shown).

During operation of the conveyor system, cigarettes pass down the chute 616 at the rate demanded by the cigarette packing machine. So long as cigarettes are supplied by the cigarette making machine at the same rate, that is to say via the conveyor 615, the reservoir conveyor 602 remains stationary. However, when the rate of supply by the maker exceeds the rate of demand by the packer, or when the packer is temporarily stopped, the conveyor 602 carries cigarettes to the left from the junction IV and into the reservoir at a speed determined by a double-plate sensor 624. Conversely, when demand exceeds supply (and assuming of course that the reservoir does at that time contain some cigarettes), or when the maker stops temporarily, the deficiency at the junction IV is made up by the reservoir conveyor which then moves to the right at a speed determined by the double sensor 624.

The conveyor 602 is driven by a drive sprocket (for example the sprocket 611) engaging the conveyor chain. The drums 604 and 605 of the reservoir are arranged to be driven at the same peripheral speed as the conveyor 602.

The end of the stack of cigarettes in the reservoir is preferably defined by an end wall 600 connected to the conveyor 602.

FIGS. 3 through 8 show in detail the laterally flexible conveyor of the present invention which may be used in the helical reservoir shown in FIGS. 1 and 2. The conveyor comprises a chain 324 connected to a conveyor surface member of plastic (shown alone in end view in FIG. 4) formed in a number of separately moulded sections joined together end-to-end. The surface member is moulded (for example from acetal or nylon) with slots 310 extending alternately from opposite edges so as to leave a series of parallel legs 312 joined together by edge portions 314 so as to form a close zig-zag shape. The cross-section of the legs is approximately square. Each surface member section has seventeen complete legs and a partial leg at each end, these partial legs being cut away respectively on the top (i.e. the leg 316 in FIG. 4) and underneath (i.e., the leg 318 in FIG. 4) so that the co-operating legs of two adjacent sections can form a lap joint. The partial leg 316 of each section has three projections 320 which engage in corresponding holes 321 in the partial leg 318 of the adjoining section. Each lap joint may be secured by an appropriate adhesive or by the application of heat, preferably by means of ultrasonics.

Figure 7:
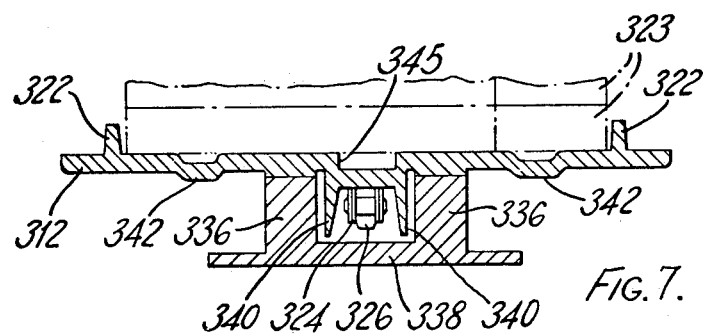
FIG. 7 is a section on the line VIII—VII of FIG. 6, showing also the conveyor track.

Near the end of each leg 312 there is an upwardly extending projection 322. As shown in FIG. 3, the projections lie close together in rows so that they limit the lateral movement of the cigarettes or other rod-articles carried by the conveyor. The articles are intended to lie across the conveyor, that is to say parallel to the legs 312, and they may be stacked up, for example to a height of 7 to 11 centimeters. FIG. 7 shows part of a stack of cigarettes 323 lying on the conveyor. The conveyor may however be used to carry a single row of cigarettes or other articles.

Figure 5:
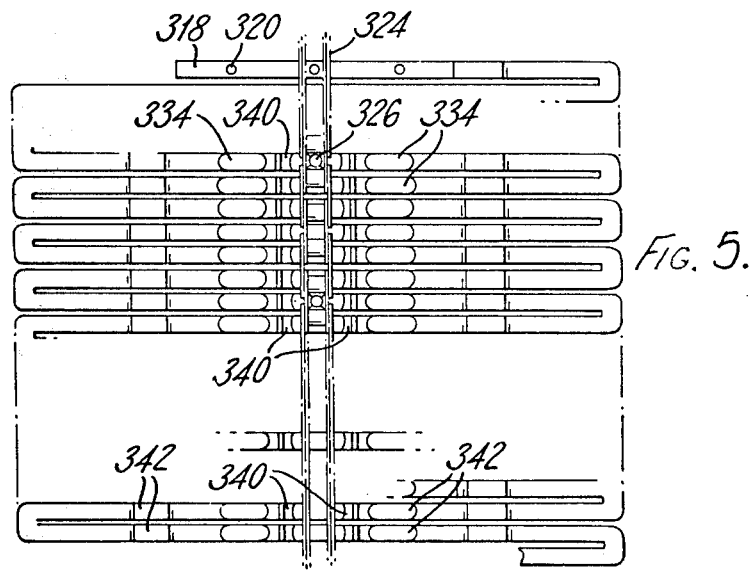
FIG. 5 is an underneath view of the conveyor of FIG. 3.
Figure 8:
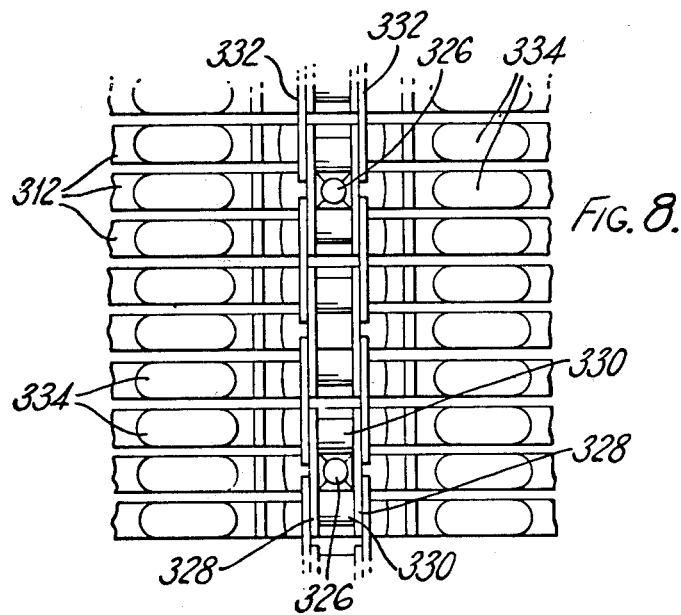
FIG. 8 is a fragmentary enlarged underneath view showing how the conveyor surface member is secured to the chain.

Along the centre line of the conveyor, beneath the conveyor surface member, lies the chain 324 which drives the conveyor surface member. As shown in FIG. 5 and 8, the chain is secured to the surface member by means of integral studs 326 on the surface member which project between each second pair of inner links 328 of the chain. The chain is of a known construction and has inner links 328 (see FIG. 8) secured together at opposite ends by tubular ferrules 330; outer pairs of links 322 connecting the inner links are themselves connected together near their opposite ends by lateral pins passing through the ferrules 330. Each section of the conveyor surface member has three studs 326. The arrangement is such that their is a stud 326 on every sixth leg 312.

The studs 326 may be secured to the chain by having their ends swaged over, for example with the application of heat.

Beneath each leg 312, on opposite sides of the centre line along which the chain extends, there are two protrusions 334 presenting flat bottom surfaces which serve as bearing surfaces sliding on the opposite walls 336 of a conveyor track 338 (see FIG. 7). The walls 336 not only carry the conveyor, but also locate the conveyor laterally by co-operation with downwardly extending guide portions 340 on the legs. The track 338 may, for example, be an extruded plastic section, for example of nylon.

Figure 6:
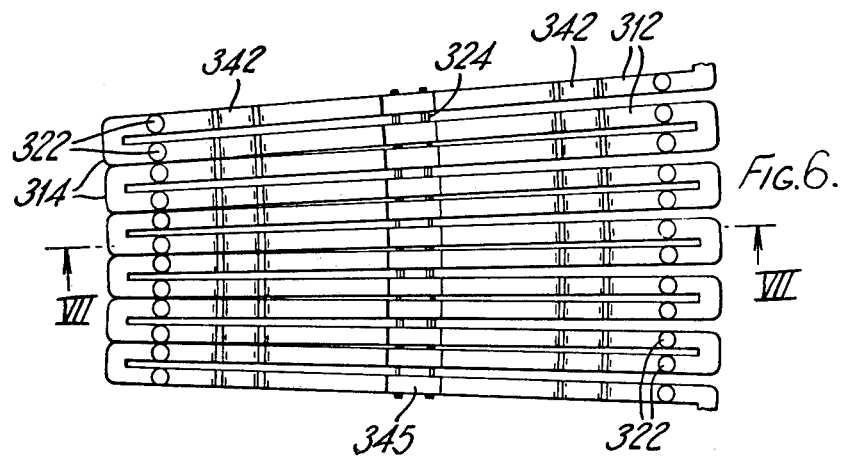
FIG. 6 is a plan view showing the conveyor in a laterally curved state.

FIG. 6 shows how the conveyor can curve laterally. It will be seen that this is accompanied by opening out of the slots on the outside of the curve (i.e., on the right as seen in FIG. 6), while the slots on the inside of the curve are reduced in width. The clearance between the links of chain enable the chain to follow the same curve. In the limiting position shown in FIG. 6, the legs touch at the inside of the curve. At this stage, it will be seen that, with the preferred arrangement shown, the width of the slots on the outside of the curve is still small in comparison with a cigarette diameter. The fact that there are slots into which the outer ends of the cigarettes (i.e., the ends on the outside of the curve) can drop slightly while the conveyor is curving round a corner assists in maintaining the cigarretes precisely radial with respect to the curve; this helps to ensure that the cigarettes are properly aligned laterally across the conveyor when they are delivered from the conveyor.

The lateral curvature shown in FIG. 6 is or may be such that the radius of curvature of the centre line of the conveyor is as little as approximately 40 centimeters.

Owing to the torsional flexibilty of the legs of the conveyor surface member, the conveyor can be curved in the manner of a band conveyor passing around a pulley. Where the chain lies on the outside of the curve, the conveyor may pass round a pulley. On the other hand, when curving in the opposite sense (i.e., with the chain at a small radius) the conveyor may be supported simply by a driving or idling sprocket around which the chain engages. The radius of the sprocket may be as small as 5 centimeters or even slightly smaller.

While it is being carried around one of the drums 604 and 605 of the reservoir shown in FIGS. 1 and 2, the conveyor surface member is supported on one side by one of the flanges 603 or 606, which extends up to the nearer row of guide portions 340, while a stationary rail (not shown) extends beneath the conveyor surface member near its outer edges to provide the necessary additional support; the rail is appropriately curved so as to support the outer edge of the surface member all the way round the drum.

By way of example, the chain 24 may be a 6 mm or quarter inch bush chain.

To assist in guiding the cigarettes onto and away from the conveyor, the legs of the conveyor surface member have rows of offset portions 342 leaving upper recesses 344 into which stationary guide fingers can extend. For example, cigarettes may be delivered from a horizontal run of the curvable conveyor onto a conventional band conveyor via a stationary bridge which would include the necessary fingers extending into the recesses 344 to help the cigarettes on the curvable conveyor to pass over the stationary bridge while the curvable conveyor curves downwards round a return sprocket. Alternatvely the bridge may have a single central finger projecting into the recess 345 shown in FIGS. 6 and 7. In this connection it should be noted that FIGS. 6 and 7 differ slightly from FIGS. 3 and 4 which do not show the recess 345. In order to be able to provide the recess 345 it is necessary to arrange that the overlapping parts 316 and 318 joining adjacent sections of the surface member together lie entirely to one side of the recess 345.

In the conveyor is intended to be curved only in one direction, one of the two rows of projections 322, namely the row on the inside of the curve, may be omitted as centrifugal force will prevent the cigarettes from sliding radially inwards; moreover there is a slight natural tendency for a stack of cigarettes to be squeezed outwards on a curve.

Instead of the projections 322 being on the legs they may be on the edge portions 314, in which case there may be just one projection on each edge portion.

Different conveyors for use in connection with cigarettes or other rod-like devices of different lengths may consist of mouldings differing only in regard to the distances between the rows of projections 322. Accordingly, the bottom part of the die for each moulding may be common to all mouldings, the only difference being in the top part of the die which determines the positions of the projections 322.

It is important to note that not every leg of the conveyor surface member is secured to the chain. The studs 326 securing the surface member to the chain are at substantial intervals, with several free legs between successive studded legs. This helps to ensure that the surface member is evenly stressed, especially when passing round a sprocket or pulley.

I claim:

1. A conveyor comprising an elongated self-supporting article support element formed by a row of laterally extending slightly spaced leg portions joined together successively at opposite sides of the support element to form a zig-zag construction embodied within a common plane, the leg portions being sufficiently long and thin to be flexible in the common plane of the support element to permit the support element to move along a laterally curved path, and being torsionally flexible to permit the support element to pass around a pulley, during which latter movement one end of each leg portion twists relative to the other end, and including a substantially inextensible, laterally flexible tension member carried by and extending along the length of the support element to withstand the tensile force applied to the conveyor during operation and to relieve the support element of any significant tensile force, said tension member being connected to said support element only at spaced points greater than the pitch of successive leg portions.

2. A conveyor according to claim 1, in which the article supporting element is of a flexible plastic material.

3. A conveyor according to claim 1, wherein said flexible tension member is a chain comprising pairs of parallel links pivoted together about lateral axes parallel to the leg portions of said support element, the said links being constructed to have lateral play whereby the chain can curve laterally in a plane parallel to said common plane.

4. A conveyor system according to claim 3, in which the pulley is in the form of a driving or idling sprocket around which the conveyor passes with the chain engaging around the sprocket.

5. A conveyor according to claim 1, in which the ends of the legs are integrally joined to one another.

6. A conveyor according to claim 5, in which the elongated support element comprises a number of sections joined end-to-end, each section comprising a number of integrally moulded legs.

7. A conveyor according to claim 6, in which the elongated support element is of a flexible plastic material.

8. A conveyor component comprising a row of parallel flexible legs integrally joined alternately at opposite ends to form a zig-zag configuration, at least one leg having a downwardly extending stud portion for engaging a tension member during use, and the end portion of the leg at one end of the row being formed with a stepped upper surface providing a recess sufficient to accommodate an end portion of the leg at the other end of the row of legs of a similar component, whereby a plurality of conveyor components can be joined together to form a conveyor of which the upper surfaces of the leg portions of successive components lie in a common plane.

9. A conveyor component according to claim 8, wherein the end portion of the leg at the opposite end of the row from said one end is formed with a stepped lower surface to engage with the stepped upper surface of the end portion of an adjacent conveyor component.

10. A conveyor comprising an elongated member consisting of a succession of transversely extending flexible horizontal legs joined alternately on opposite sides of the elongated member to form a zig-zag arrangement; a substantially inextensible, laterally flexible tension member in the form of a chain which is carried by and extends along substantially the entire length of the elongated member to relieve the elongated member of any longitudinal tension, said chain comprising links pivoted to one another about axes parallel to the legs, the pivoted connections being constructed to have slight play whereby the chain can flex laterally to a limited extent, said chain being secured to said elongated member at longitudinally spaced intervals by studs which are formed on legs of the elongated member and engage in the links of the chain; and means defining a path for the conveyor extending through a succession of horizontal planes including guide means curving laterally in a substantially horizontal plane and at least one pulley which is mounted for rotation about a substantially horizontal axis for guiding the conveyor from one horizontal plane towards another horizontal plane.

11. A conveyor comprising an elongated member consisting of a succession of transversely extending flexible horizontal legs joined alternately on opposite sides of the elongated member to form a zig-zag arrangement, first and second rows of guide portions extending downwards from said legs to guide the conveyor in a track during use, and a substantially inextensible, laterally flexible tension member lying between said first and second rows of guide portions and which is carried by and extends along substantially the entire length of the elongated member to relieve the elongated member of any longitudinal tension; and means defining a path for the conveyor extending through a succession of horizontal plane and at least one pulley which is mounted for rotation about a substantially horizontal axis for guiding the conveyor from one horizontal plane towards another horizontal plane.

12. A conveyor comprising an elongated article supporting means having an article supporting surface and having a flexible construction so as to be capable of passing around a pulley and including means defining slots extending into the article supporting means at regular intervals from opposite edges, thereby forming a row of laterally extending leg portions integrally joined together, whereby the article supporting means is capable of curving laterally in the plane of the article supporting surface, and including a chain connected to the article supporting member at regular intervals greater than the pitch of successive leg portions, the chain comprising pairs of parallel links pivoted together about lateral axes parallel to the article supporting surface, the said links having lateral play whereby the chain can serve laterally in the direction of the article supporting surface, each connection between the article supporting means and the chain being formed by a stud on the article supporting means engaging between two parallel links of the chain.

13. A conveyor comprising an elongated article supporting means having an article supporting surface and having a flexible construction so as to be capable of passing around a pulley and including means defining slots extending into the article supporting means at regular intervals from opposite edges, thereby forming a row of laterally extending leg portions integrally joined together, whereby the article supporting means is capable of curving laterally in the plane of the article supporting surface, and including a chain connected to the article supporting member at regular intervals greater than the pitch of successive leg portions, the chain comprising pairs of parallel links pivoted together about lateral axes parallel to the article suppporting surface, the said links having lateral play whereby the chain can curve laterally in the direction of the article supporting surface the leg portions being formed with bottom protrusions on both sides of the chain for resting on support rails and the chain extending substantially along the center line of the conveyor.

14. A conveyor according to claim 13, in which the leg portions are formed with downwardly projecting guide portions, at least along one side of the chain, for constraining the conveyor against lateral movement.

15. A conveyor component comprising a row of parallel flexible legs integrally joined alternately at opposite ends to form a zig-zag configuration, at least one leg having a downwardly extending stud portion for engaging a tension member during use, and the end portion of the leg at the respective ends of the row being of reduced thickness, whereby a plurality of conveyor components can be joined together to form a conveyor.

16. A conveyor component according to claim 15, wherein the end portion of the leg at one end of the row has its upper surface recessed and the end portion of the leg at the other end of the row has its lower surface correspondingly recessed.

17. A conveyor component according to claim 16, wherein the end portion of one of said legs of reduced thickness being formed with a plurality of holes and the other of said legs of reduced thickness having a plurality of projections for engaging in the holes in the adjacent end portion of a similar component.

18. A conveyor component according to claim 15, including a plurality of projecting portions each extending downwards from at least some of said legs to form two laterally spaced longitudinal rows for guiding the component along a track during use.

19. A conveyor component according to claim 15, including a pair of bottom protrusions on each leg forming two laterally spaced rows extending longitudinally along the component forming bearing surfaces for resting on guide tracks during use.

20. A conveyor component according to claim 15, wherein the cross section of each leg is approximately square.

21. A conveyor component according to claim 15, wherein each leg is provided with at least one offset portion providing a recess in the upper surface thereof thereby providing a longitudinal channel capable of accommodating the end of a bridge member during use.

* * * * *